(12) United States Patent
Arokiaraj et al.

(10) Patent No.: US 9,547,411 B2
(45) Date of Patent: *Jan. 17, 2017

(54) NAVIGATION OF A GRAPHICAL REPRESENTATION

(71) Applicant: INTERNATIONAL BUSINESS MACHINES CORPORATION, Armonk, NY (US)

(72) Inventors: Francis S. Arokiaraj, Karnataka (IN); Sairam Bantupalli, Bangalore (IN); Sreenivasulu Valmeti, Andhra Pradesh (IN); Senthil K. Venkatesan, Nadu (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/641,473

(22) Filed: Mar. 9, 2015

(65) Prior Publication Data

US 2015/0253964 A1    Sep. 10, 2015

Related U.S. Application Data

(63) Continuation of application No. 14/197,337, filed on Mar. 5, 2014.

(51) Int. Cl.
*G06F 3/048* (2013.01)
*G06F 3/0481* (2013.01)
(Continued)

(52) U.S. Cl.
CPC ......... *G06F 3/04812* (2013.01); *G06F 3/0482* (2013.01); *G06F 3/04817* (2013.01); *G06F 3/04842* (2013.01); *G06F 3/04892* (2013.01)

(58) Field of Classification Search
CPC .............. G06F 3/04842; G06F 3/04812; G06F 3/04817; G06F 3/0482; G06F 3/04892
(Continued)

(56) References Cited

U.S. PATENT DOCUMENTS 5,550,971 A * 8/1996 Brunner .............. G06F 17/3048
6,104,401 A * 8/2000 Parsons ................. G06F 3/0481
707/E17.119

(Continued)

OTHER PUBLICATIONS

"Specifying Relationship rules", taken from http://webhelp.esri.com/arcgisdesktop/9.3/body.cfm?tocVisable=0&ID=5845&TopicName=Specifying%20Relationship%20rules, published Jun. 5, 2008, pp. 1-4.*

(Continued)

*Primary Examiner* — William Bashore
*Assistant Examiner* — Gregory A DiStefano
(74) *Attorney, Agent, or Firm* — Cantor Colburn LLP; Maeve Carpenter (57) ABSTRACT

Embodiments include a system, method and computer program product for navigating a graphical representation displayed in a graphical user interface (GUI). According to one embodiment, the method includes receiving, at a computer system, a first input indicating a selection of a source element, receiving a second input indicating a relationship for the source element, identifying one or more target elements having a relationship with the source element, and displaying the one or more target elements identified within a visible area of a display.

7 Claims, 5 Drawing Sheets

(51) Int. Cl.
*G06F 3/0484* (2013.01)
*G06F 3/0482* (2013.01)
*G06F 3/0489* (2013.01)

(58) Field of Classification Search
USPC .......................................................... 715/734
See application file for complete search history.

(56) References Cited

U.S. PATENT DOCUMENTS

| | | | | |
|---|---|---|---|---|
| 6,353,452 | B1* | 3/2002 | Hamada | G06F 17/30392 |
| | | | | 707/999.004 |
| 6,968,340 | B1* | 11/2005 | Knowles | G06F 8/10 |
| 8,566,751 | B2* | 10/2013 | Kelley | G06F 3/04812 |
| | | | | 715/857 |
| 8,904,302 | B2* | 12/2014 | Higgins | G06F 8/33 |
| | | | | 715/769 |
| 2005/0131927 | A1* | 6/2005 | Fildebrandt | G06F 8/34 |
| 2007/0022000 | A1 | 1/2007 | Bodart et al. | |
| 2007/0101321 | A1* | 5/2007 | Mahoney | G06F 8/34 |
| | | | | 717/168 |
| 2009/0249257 | A1* | 10/2009 | Bove | G06F 3/04812 |
| | | | | 715/858 |
| 2010/0262949 | A1* | 10/2010 | Jacobsen | G06F 8/33 |
| | | | | 717/105 |
| 2012/0131483 | A1* | 5/2012 | Archer | G06F 17/30899 |
| | | | | 715/766 |
| 2013/0061145 | A1 | 3/2013 | Gilbert et al. | |
| 2014/0098103 | A1 | 4/2014 | Hirsch et al. | |
| 2014/0195515 | A1 | 7/2014 | Baker et al. | |
| 2014/0281865 | A1* | 9/2014 | Goranson | G06F 17/30899 |
| | | | | 715/208 |
| 2014/0304214 | A1 | 10/2014 | Sakunkoo et al. | |

OTHER PUBLICATIONS

List of IBM Patents or Patent Applications Treated as Releated—Date Filed: Mar. 9, 2015; 2 pages.
U.S. Appl. No. 14/197,337, filed Mar. 5, 2014; Entitled: Navigation of a Graphical Representation.

* cited by examiner

NAVIGATION OF A GRAPHICAL REPRESENTATION

DOMESTIC PRIORITY

This application is a continuation of the legally related U.S. patent application Ser. No. 14/197,337 filed Mar. 5, 2014, which is fully incorporated herein by reference.

BACKGROUND

The present invention relates to information technology, and more specifically, to navigation of a graphical representation.

Graphical representations comprise a set of elements and are displayed using a graphical user interface (GUI). An element of the set of elements may be linked with another if a relationship exists between them. The linked elements depict that there exists a relationship between them. The elements may be linked using connectors. For example in a unified modeling language (UML) drawing, a source element is linked to one or more target elements using connectors.

SUMMARY

Embodiments of the present invention include a system, a computer program product and a method of navigating a graphical representation displayed in a graphical user interface (GUI), wherein the method comprises receiving, at a computer system, a first input indicating a selection of a source element, receiving a second input indicating a relationship for the source element, identifying one or more target elements having a relationship with the source element, and displaying the one or more target elements identified within a visible area of a display.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Exemplary embodiments will be described in more detail with reference to the accompanying drawings, in which the exemplary embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
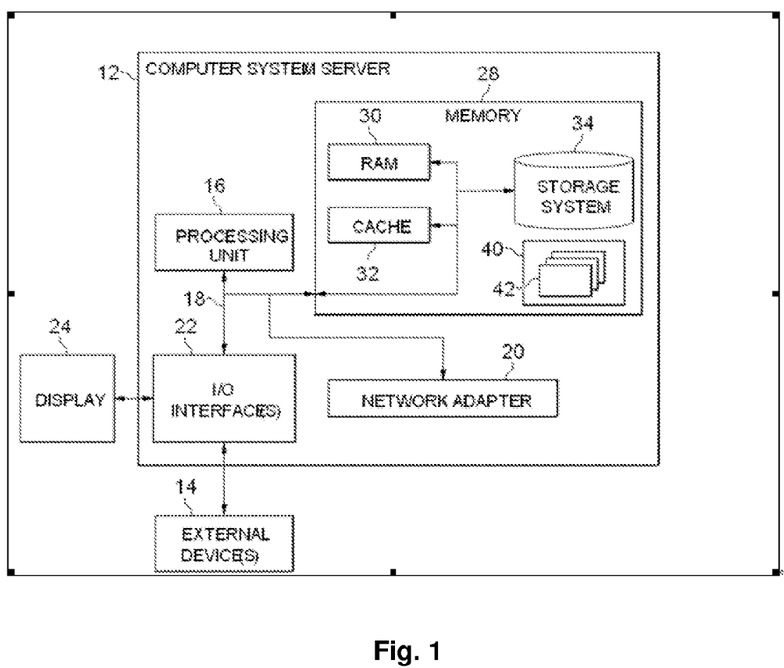
FIG. 1 shows an exemplary computer system 12 in accordance with an exemplary embodiment.

Referring now to FIG. 1, in which an exemplary computer system/sever 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
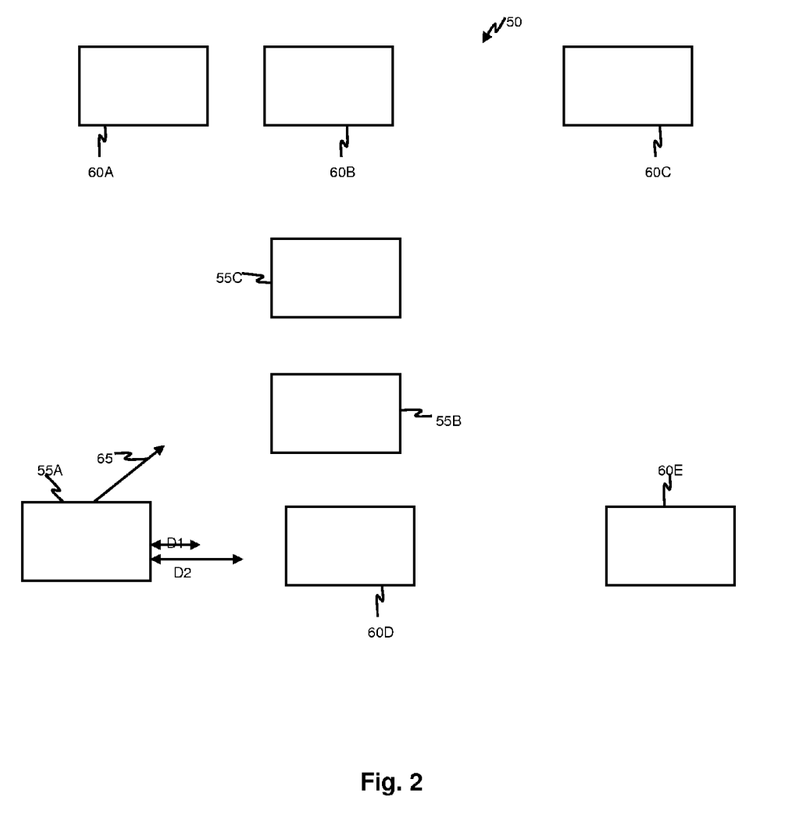
FIG. 2 shows an exemplary graphical representation 50 including a plurality of source elements and a plurality of target elements in accordance with an exemplary embodiment.

With reference now to FIG. 2, a graphical representation 50 comprising a plurality of source elements 55A, 55B, 55C and a plurality of target elements 60A, 60B, 60C, 60D 60E is illustrated according to one embodiment of the present invention. The graphical representation 50 may be a unified modeling language (UML) diagram, a map, a graphical chart, a diagram and the like. In the shown example of FIG. 1, the graphical representation 50 illustrated is a UML diagram. The source elements 55A, 55B, 55C may be UML interfaces and the target elements 60A, 60B, 60C, 60D 60E may be UML classes. Generally, a source element 55A, 55B, 55C is linked to a target element 60A, 60B, 60C, 60D 60E based on a relationship. A user may select a source element and link the source element to a target element via a relationship. According to one embodiment of the present invention, the user may select a source element and provide a relationship using which the source element is to be linked to a target element. The selection of the source element and the relationship may be provided as inputs to a processing unit (e.g., the processing unit 16 in FIG. 1). The input may be provided using one ore more external devices (e.g., the external devices 14 in FIG. 1). According to one example, the relationship may be selected from a menu provided using a Graphical User Interface (GUI). According to another example, the relationship may be selected from a drop down menu. The menu may list different types of relationships.

According to one embodiment of the present invention, the processing unit is configured to identify one or more target elements having the selected relationship with the source element. The processing unit is further configured to provide an output to a display (e.g., the display 24 in FIG. 1) such that all identified target elements are displayed within a visible area of the display.

In the shown example of FIG. 2, for illustration purposes, the source element 55A is considered as the selected source element. The relationship selected is a realization. The target elements 60A, 60B, 60C, 60D, 60E are identified as possible target elements associated with a realization relationship with the source element 55A. The target elements 60A, 60B are originally displayed within a visible area of the display and the target elements 60C, 60D, 60E, are originally not within the visible area. As the target elements 60C, 60D, 60E are the possible target elements, the same are displayed within the visible area of the display. This reduces the difficulty in navigation from the source element 55A to one or more possible target elements 60A, 60B, 60C, 60D, 60E. According to one embodiment of the present invention, the possible target elements 60A, 60B, 60C, 60D, 60E displayed within the visible area may be visually indicated. For example, the visual indication may be provided by highlighting the possible target elements 60A, 60B, 60C, 60D, 60E. The user may link the source element 55A to the desired target element.

According to one embodiment of the present invention, the processing unit may be configured to determine the direction of navigation from the source element 55A. For example, the direction of navigation may be determined by determining the direction of movement of a cursor of the GUI. In the shown example of FIG. 2, the direction of navigation is indicated using an arrow 65. The processing unit may be further configured to identify the target element in the direction of navigation. In the shown example of FIG. 2, the target element 60C in the direction of navigation is identified. The target element 60C identified may be visually indicated to the user. For example, the visual indication may include highlighting the target element 60C. If the visually indicated target element 60C is the desired target element to be linked with the source element 55A, the user may provide an input indicating the same. The processing unit on receiving this input may be configured to link the source element 55A and the target element 60C. In the shown example of FIG. 2, the linking of the source element 55A and the target element 60C is illustrated using a connector 70.

In aspects, when there two or more possible target elements are in the same direction of navigation, the desired target element may be identified based on navigation in the same direction. In the shown example of FIG. 2, the target elements 60D and 60E are in the same direction of navigation. According to one embodiment of the present invention, the processing unit is configured to determine a distance of navigation from the source element and identify the desired target element responsive to the distance. In the shown example of FIG. 2, the user navigates using the cursor of a pointing device to a distance D1. The distance D1 is associated with the target element 60D and the processing unit is configured to identify the target element 60D as the desired target element if the distance of navigation from the source element is D1. The distance D2 is associated with the target element 60E and the processing unit is configured to identify the target element 60E as the desired target element if the distance of navigation from the source element is D2. In the shown example of FIG. 2, it can be seen that the distance D1 and D2 are in the same direction of navigation and distance D2 is greater than the distance D1. The processing unit may be configured to provide a visual indication of the identified target element. The processing unit may be further configured to link the source element and the identified target element on receiving an input from the user.

Figure 3:
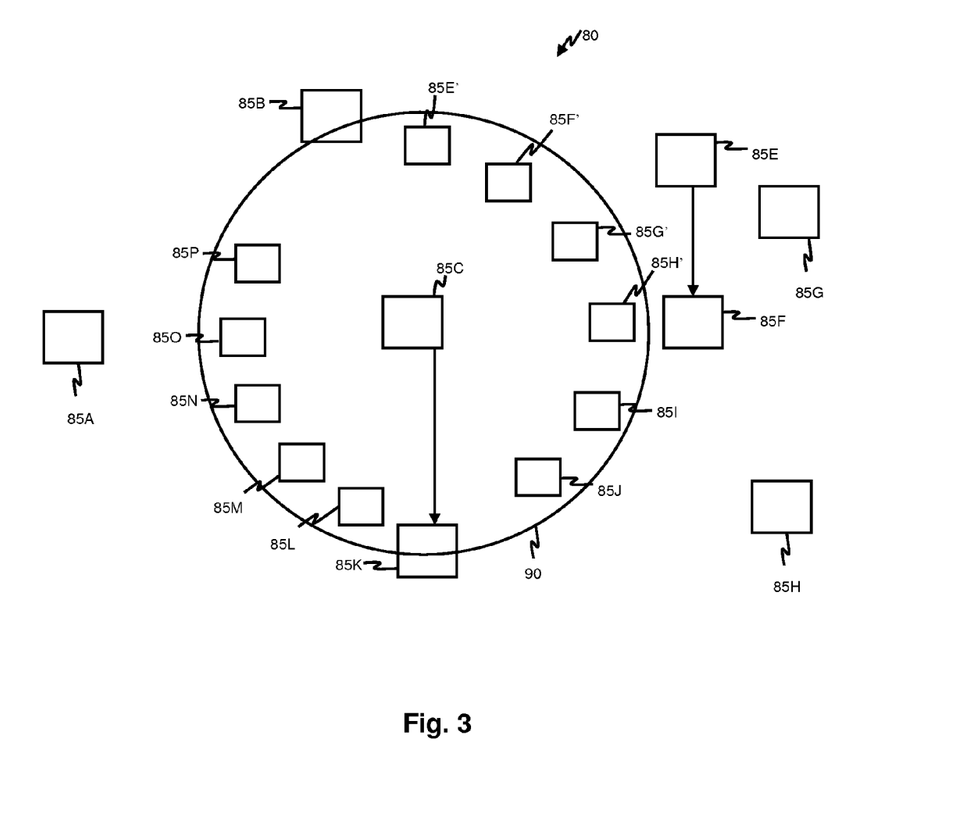
FIG. 3 shows an exemplary a graphical representation 80 including a plurality of elements in accordance with an exemplary embodiment.

With reference now to FIG. 3, a graphical representation 80 comprising a plurality of elements is illustrated according to one embodiment of the present invention. In the shown example of FIG. 3, a connection from a source element is to be created to a target element. For example, a connection from the element 85C is to be created to a target element. The element 85C here is the source element. The user may select the element 85C using an input device. According to one embodiment of the present invention, a processing unit (e.g., the processing unit 16 in FIG. 1) is configured to generate an overlay 90 and provide an output of the same to a display (e.g., the display 24 in FIG. 1) for displaying. The processing unit is further configured to identify all possible target elements displayed within the visible area of the display and in the non-visible area of the display which may be connected from the element 85C. For example, the target elements connectable from the element 85C may be identified based on a relationship with the element 85C. The processing unit is further configured to display all the identified possible target elements connectable from the element 85C within the overlay 90. This provides the advantage of displaying all possible target elements connectable from the source element 85C within the visible area and thus, provides the advantage of easy navigation. In the shown example, of FIG. 3, the elements 85E, 85F, 85G, 85H are initially displayed within the visible area. However, since the elements 85E, 85F, 85G, 85H are possible target elements, the same are also displayed within the overlay 90, illustrated as the elements 85E', 85F', 85G', 85H'. The elements 85I, 85J, 85K, 85L, 85M, 85N, 85O, and 85P were in the non-visible area of the display. According to one embodiment of the present invention, the overlay 90 may be displayed around the current selected source element, i.e., 85 C.

The user may select the desired target element displayed within the overlay 90 for creating the connection from the source element 85C. In the shown example of FIG. 3, the element 85K is selected as the desired target element. On the user selecting the desired target element 85K, the processing unit is configured to cease displaying the overlay 90 via the display and link the source element 85C with the target element 85H. In the shown example of FIG. 3, the linking of the source element 85C with the target element 85H is illustrated using a connector 95. If the element selected within the overlay 90 is not within the visible area of the display, the source element is linked to the selected target element. The linked target element may not be displayed within the visible area. According to one embodiment of the present invention, the area of the overlay 90 is configurable depending on the number of elements to be displayed within the overlay 90. The processing unit may be configured to increase or decrease the area of the overlay 90 based on an input received from a user. The user may provide an input to increase the area of the overlay 90 in case all the possible target elements relating to a source element are not displayed within the overlay 90.

Figure 4:
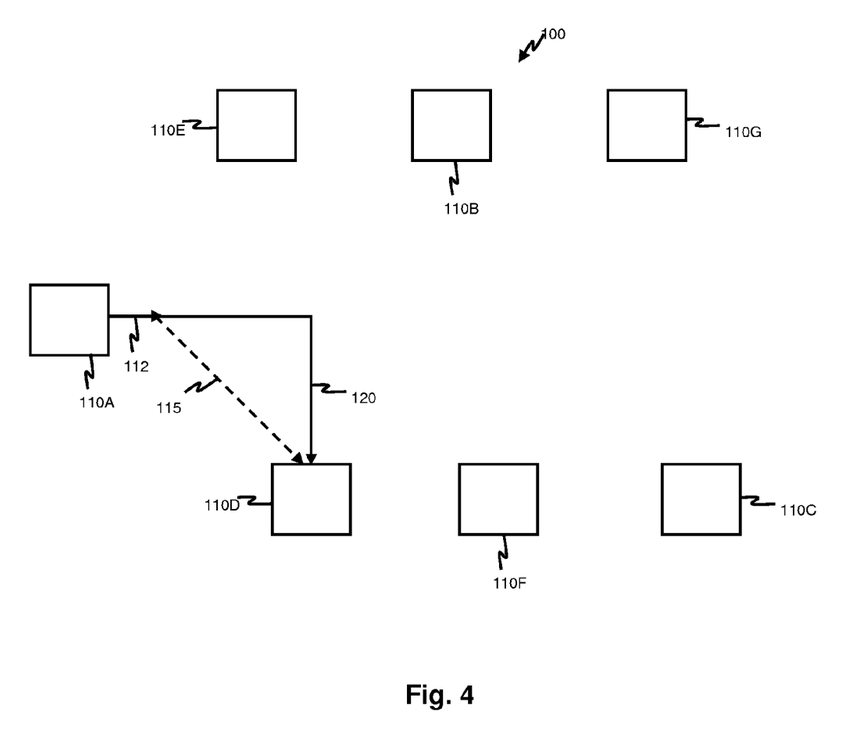
FIG. 4 shows an exemplary a graphical representation 100 including a plurality of elements in accordance with an exemplary embodiment.

With reference now to FIG. 4, a graphical representation 100 comprising a plurality of elements 110A, 110B, 110C, 110D, 110E, 110F, 110G is illustrated according to one embodiment of the present invention. In the shown example of FIG. 4, the elements 110B, 110C, 110D are the possible target elements with respect to the element 110A. Therefore, the element 110 A is the source element for the possible target elements 110B, 110C, 110D. The element 110A is to be linked to one or more desired possible target elements 110B, 110C, 110D. A user may link the source element 110A to one or more desired possible target elements 110B, 110C, 110D by navigating from the source element 110A to the desired possible target elements 110B, 110C, 110D. For example, a user may navigate from the source element 110A to the desired possible target elements 110B, 110C, 110D using a drag and drop process. The drag and drop process may be performed using a pointer device by dragging the cursor from the source element 110A.

According to one embodiment of the present invention, a processing unit (e.g., the processing unit 16 in FIG. 1) is configured to identify the proximate possible target element from the position of the cursor during navigation from the source element 110A. The position of the cursor is illustrated using an arrow 112. The processing unit is further configured to temporarily link the source element 110A and the proximate possible target element. In the shown example of FIG. 4, the possible target element 110D is proximate to the cursor and is temporarily linked to the source element 110A. The possible target element 110D is linked temporarily using a temporary connector illustrated as a connector 115. If the possible target element 110D is the desired possible target element to be linked with the source element 110A, the user may provide an indication of the same as an input. The processing unit on receiving this input is configured to link the source element 110A and the possible target element permanently, illustrated a connector 120. For example, the input may be provided by the user leaving the pointer device. If the possible target element 110D is not the desired possible target element, the user may continue navigating further. The next possible target element 110B proximate to the cursor may be identified and temporarily linked to the source element 110A.

Figure 5:
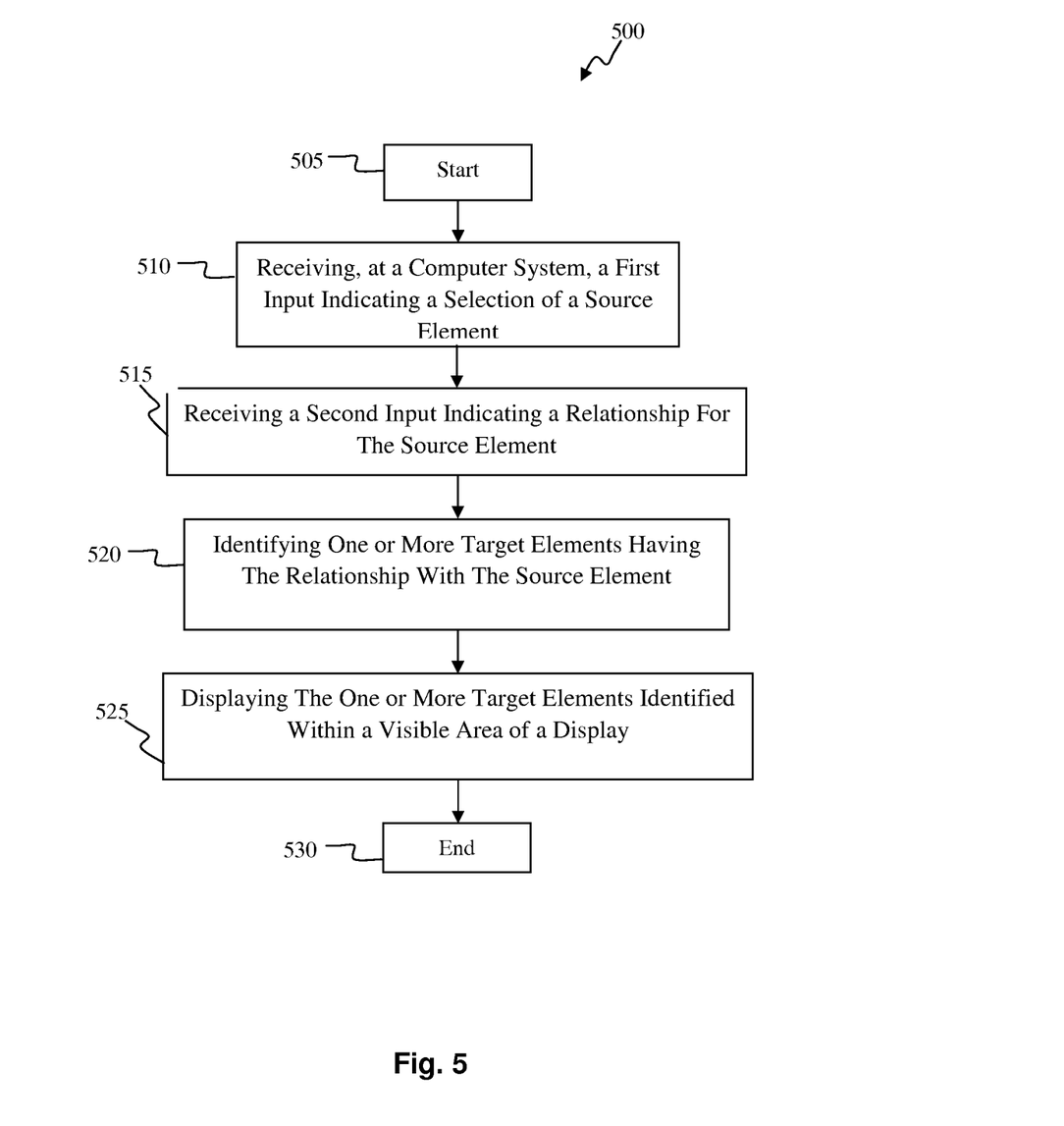
FIG. 5 depicts an exemplary flow for a process 500 in accordance with an exemplary embodiment.

FIG. 5 depicts an exemplary flow for a process 500 in accordance with aspects of the present invention. In embodiments, the process 500 can be performed by the computer system 12 in FIG. 1.

At step 505, the process starts. At step 510, a first input indicating a selection of a source element (e.g., the source element 55A in FIG. 2) is received at a computer system (e.g., the computer system 12 in FIG. 1). The first input may be provided to the computer system via one or more external devices (e.g., the external devices 14 in FIG. 1). At step 515, a second input indicating a relationship for the source element is received. For example, the relationship may be selected from a drop down menu provided by a GUI. At step 520, one or more target elements (e.g., the target elements 60A, 60B, 60C, 60D 60E in FIG. 2) having the relationship with the source element are identified. The target elements may be within the visible area of the display and/or non visible area of the display. At step 525, the one or more target elements identified are displayed within a visible area of a display. The one or more target elements having the relationship with the source element are displayed within the visible area of the display. At step 530, the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments described herein provide easy navigation in a graphical representation. For example, the graphical representation may a UML diagram, a map, a graphical structure, a graphical chart, and the like. Displaying all possible target elements within the visible area provides a easy view of all the possible target elements. Additionally, the identification of the desired target element based on the direction of navigation and the distance of navigation from the source elements assists in easy navigation as the user is not required to navigate from the source element to the desired target element for linking them. Moreover, the linking of the source element and the target element based on the proximity of the possible target element to the cursor provides the advantage of easy linking of the source element and the desired target element.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of navigating a graphical representation displayed in a graphical user interface (GUI), the method comprising:

displaying a diagram illustrating a plurality of visible elements;

receiving, by a computer system, a first input indicating a selection of a source element, wherein the source element from the plurality of visible elements;

receiving a second input indicating a relationship for the source element;

identifying one or more target elements having the relationship with the source element, wherein the one or more target elements include at least one of the plurality of visible elements and at least one element that is not visible in the diagram; and displaying, based on receiving the second input, the one or more target elements within an overlay on the display, wherein the overlay displays the source element and the one or more of the target elements including the at least one element not visible in the diagram.

2. The method of claim 1, further comprising:
receiving as an input, a selection of the target element;
linking the source element and the selected target element; and
removing the overlay from the display after linking the source element and the selected target element.

3. The method of claim 1, further comprising:
determining a direction of navigation of from the source element;
identifying the target element in the direction of navigation; and
indicating visually the target element in the direction of navigation.

4. The method of claim 3, further comprising linking the source element and the target element in the direction of navigation on receiving an input.

5. The method of claim 1, wherein the overlay is at least partially transparent.

6. The method of claim 1, further comprising:
determining a distance a cursor of a graphical input interface is moved from the source element;
identifying said target element responsive to the distance; and
indicating visually said target element.

7. The method of claim 1, further comprising:
identifying said target element proximate to a cursor of a graphical user interface; and
linking the source element and said target element being proximate to the cursor.

* * * * *